United States Patent [19]

Stewart

[11] Patent Number: 4,503,171
[45] Date of Patent: Mar. 5, 1985

[54] GRAPHITE REINFORCED PERFLUOROELASTOMER

[75] Inventor: Charles W. Stewart, Newark, Del.

[73] Assignee: E. I. Du Pont de Nemours and Company, Wilmington, Del.

[21] Appl. No.: 569,975

[22] Filed: Jan. 11, 1984

[51] Int. Cl.$^3$ .............................. C08K 9/04; C08K 3/04
[52] U.S. Cl. ................................. 523/215; 106/288 B; 428/407; 524/544
[58] Field of Search .................... 523/215; 106/288 B; 428/407

[56] References Cited

U.S. PATENT DOCUMENTS

| | | | |
|---|---|---|---|
| 3,723,607 | 3/1973 | Kalnin | 523/215 |
| 3,767,774 | 10/1973 | Hou | 523/215 |
| 4,214,060 | 7/1980 | Apotheker et al. | 525/368 |
| 4,251,432 | 2/1981 | Martin | 525/200 |
| 4,252,859 | 2/1981 | Concannon et al. | 525/200 |
| 4,281,092 | 7/1981 | Breazeale | 525/360 |
| 4,413,094 | 11/1983 | Aufdermarsh | 525/187 |

FOREIGN PATENT DOCUMENTS 0177066  10/1982  Japan .................................. 523/215

Primary Examiner—Herbert J. Lilling

[57] ABSTRACT

Graphite particularly suitable for compounding with perfluoroelastomers having grafted thereto reactive sites having a fluorinated aromatic ring. The perfluoroelastomer blends exhibit markedly improved tensile strength while retaining the outstanding thermal and chemical stability of the perfluoroelastomers.

4 Claims, No Drawings

GRAPHITE REINFORCED PERFLUOROELASTOMER

BACKGROUND OF THE INVENTION

A variety of fillers is used in elastomeric materials both for the purpose of increasing bulk as well as reinforcement. Carbon black is widely used as a reinforcing filler, and improves the tensile strength of a wide variety of elastomers. However, fluoroelastomers have presented special problems in this regard, since the reinforcing materials used for elastomers in general have little or no beneficial effect when used with fluorinated elastomers. Accordingly, fillers with coupling agents in conjunction with carbonaceous fillers have been suggested for certain peroxide curable, hydrogen containing, fluoroelastomers in Martin U.S. Pat. No. 4,251,432. However, these coated carbonaceous fillers are ineffective when used with non-hydrogen containing perfluoroelastomers of the type prepared from tetrafluoroethylene and perfluoromethyl perfluorovinyl ether. Such elastomeric materials have extraordinary resistance to corrosive high temperature environments, but typically exhibit a low tensile strength and elongation at break which limits their range of applicability. These low tensile properties require the use of separate backing elements in conjunction with parts made from such polymers. A need therefore exists for fillers which can be effectively used to reinforce perfluoroelastomers and particularly to improve the tensile properties of these materials.

SUMMARY OF THE INVENTION

The present invention is based on the discovery of a new, grafted graphite which is particularly suitable for compounding with perfluoroelastomers.

Specifically, the instant invention provides a solid, particulate, carbonaceous filler having chemically bonded thereto reactive sites of the general formula

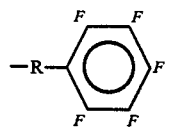

wherein R is selected from the group consisting of a divalent bond, —CH$_2$— and —CH$_2$CH$_2$—.

The invention further provides an elastomeric composition comprising, complementally, (a) 95–50 weight percent of at least one perfluoronated elastomer prepared from tetrafluoroethylene, perfluoromethylvinylether and a monomer of the general formula

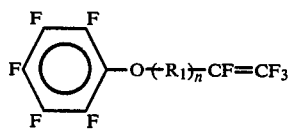

wherein R$_1$ is selected from

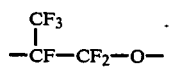

and

—CF$_2$CH$_2$CH$_2$—O— and wherein n is 0, 1 or 2 and (b) 5–50 weight percent of a solid particulate carbonaceous filler as described above.

DETAILED DESCRIPTION OF THE INVENTION

The present invention is based on the discovery of certain carbonaceous particulate fillers which, by virtue of the reactive sites bonded thereto, are particularly suitable for use as fillers for perfluoroelastomers. The carbonaceous materials used can be graphite or a carbon black which has been cleaned to remove surface impurities which interfere with the grafting reaction. Graphites are commercially available in a wide variety of particle sizes which are suitable for use as fillers in elastomers. In general, the graphite will have a surface area of about from 100 to 0.1 square meters per gram and a particle size of about from 0.01 to 10 millimicrons. One particularly satisfactory graphite is that commercially available from Alpha Ventron Corporation, having a particle diameter of about 5 millimicrons and a surface area of 0.6 square meters per gram.

In event that carbon black is used for the preparation of the particulate filler, the carbon black should first be treated to remove surface impurities, for example, by heating at elevated temperatures and the absence of air. Temperatures of about 1000° C. for a period of about 4 hrs. have been found to be satisfactory for the removal of the sulfur oxygen and hydrogen that would otherwise interfere with the grafting reaction if untreated carbon black were used.

The carbonaceous material, and preferably graphite, is reacted with a compound having the general formula:

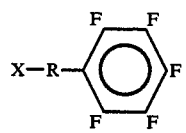

wherein R is as defined above and X is selected from iodine or bromine. These compounds are available through normal commercial channels.

In the preparation of the particulate carbonaceous material having reactive sites bonded thereto, the graphite or purified carbon black is first heated in the presence of sodium or similar group I metal, such as lithium or potassium, to temperatures above the melting point of the metal and simultaneously or subsequently treated with a solvating ether medium which is inert to the fluoronated substituents to be bonded to the carbonaceous material and also inert to the metal. The resulting carbonaceous product is then reacted with the iodo- or bromo-compounds noted above to provide the carbonaceous fillers of the present invention. The carbonaceous material having reactive sites bonded thereto is prepared according to the general procedures for bonding substituent groups described in Rivin, U.S. Pat. No. 3,479,300, hereby incorporated by reference.

In the initial treatment of the carbonaceous material with metal, a temperature of about from 100° C. to 300° C., and preferably about 200° C., is used for best results. The particular solvating ether which is used after the metal treatment can very widely, and can be selected from 1,2-dimethoxyethane, tetrahydrofuran, 1,2-diethoxyethane dimethylether, dioxane and alkylated tetrahydrofurans such as methyltetrahydrofuran.

After the treatment of the carbonaceous material with metal and solvating ether, it is brought into contact with the fluorinated compounds of the formula noted above. Removal of the solvating ether is not necessary, and, in fact, the presence of ether during the addition of the iodo- or bromo-compound may facilitate the completed reaction of the iodo- or bromo-compound with the carbon radical-ion formed from interaction with the sodium or other metal.

In general, the reaction with bromo- or iodo compound should be continued to provide at least about 0.1 millimoles of reactive sites per 100 square meters of surface area of the carbonaceous material. The reaction times with the bromo- or iodo-compounds will vary somewhat, but, in general the reaction will be substantially complete in about from 2 to 12 hours.

After reaction with the iodo- or bromo-compound, the carbonaceous material is typically isolated by washing with an acid solution, water or additional quantities of the solvating ether, or combinations thereof, and then dried.

The perfluoronated elastomers used in accordance of the present invention can be prepared from tetrafluoroethylene, perfluoromethyl perfluorovinyl ether and monomers as described in Pattison, U.S. Pat. No. 3,467,638 and Brizzolara et al., U.S. Pat. No. 3,682,872, both of which are hereby incorporated by reference. The grafted carbonaceous material can be blended in the desired concentrations using ordinary rubber compounding techniques, such as roll milling or mixing with a Banbury mixer.

The blends of perfluoroelastomer and grafted carbonaceous material, as provided by the instant invention, retain the outstanding thermal and chemical stability of the perfluoroelastomers, and, in addition, exhibit markedly improved tensile strength.

The invention is further illustrated in the following specific examples, in which parts and percentages are by weight unless otherwise indicated.

EXAMPLE I

A 15 gm sample of SAF carbon black was cleansed by heating in a tube furnace for 4 hours at 1000° C. under vacuum. The cleansed particles were cooled to room temperature, exposed to air and were placed in a 500 ml three neck flask fitted with a mechanical stirrer, gas inlet and outlet tubes with a bubbler on the outlet tube. The particles were dried at 200° C. with a stream of nitrogen. A quantity of 2 gms sodium was added to the flask and the contents were heated to 200° C. for one hour with stirring, during which time the sodium partially coated the surface of the black particles. A quantity of 150 cc tetrahydrofuran (THF) was added at room temperature and the flask was heated to 50° C. for 4 hours.

To the resulting reactive carbon slurry was added 3 gms iodopentafluorobenzene at room temperature and the reaction was allowed to proceed for 12 hours. The reacted carbon was isolated by adding 20 cc hydrochloric acid (HCl) and washing three times with water and THF. The resulting black was dried at 100° C. for 24 hours.

The reacted carbon particles were mill mixed into an elastomeric copolymer of perfluoromethylvinyl ether, tetrafluoroethylene, and perfluoro-2(phenoxypropyl)vinyl ether prepared as discussed in Brizzolara et al., U.S. Pat. No. 3,682,872. The formulation was as follows: 100 parts elastomer, 4 parts PbO, 4 parts DCH-13 Crown 6, 3 dipotassium salt of bishpenol AF, and 20 parts reacted carbon. The compound was pressed into 0.2 cm thick slabs and cured at 177° C. for 60 minutes followed by a heat treatment under nitrogen. The heat treatment was carried out for 4 hours at 90° C., 6 hours at 90° to 204° C., 12 hours at 204° C., 6 hours at 288° C., and 18 hours at 288° C. Test pieces were cut from the slabs and were subjected to tensile tests and tear tests, carried out at both 100° C. and 177° C. The results are shown in Table I along with results for an SAF black control which was cleansed as in this Example but was not reacted further.

TABLE I

High temperature Tensile and Tear Tests of Fluoroelastomers Containing Reacted SAF Black vs SAF Black Control

|  |  | Control | Example I |
|---|---|---|---|
| 100° C. | phr | 20 | 20 |
|  | $T_B$ (MPa) | 3.2 | 5.1 |
|  | $E_B$ (%) | 80 | 115 |
|  | Tear (kN/m) | 1.2 | 1.2 |
| 177° C. | $T_B$ (MPa) | 1.6 | 2.7 |
|  | $E_B$ (%) | 60 | 60 |
|  | Tear (kN/m) | 0.1 | 0.5 |

$T_B$ = tensile strength at break (ASTM D-412)
$E_B$ = elongation at break (ASTM D-412)
Tear = tear strength (ASTM D-470)

The reacted SAF black results in increased tensile and tear strengths at high temperatures when used to reinforce the perfluoroelastomer.

EXAMPLE II

A 20 gm sample of a 5 um graphite powder commercially available from Alfa Ventron Corp. was reacted with sodium metal and with iodopentafluorobenzene as in Example I. The reacted graphite particles were mixed into a formulation of perfluoroelastomer as used in Example I as follows: 100 parts perfluoroelastomer, 4 parts PbO, 4 parts DCH-13 Crown 6, 3 parts dipotassium salt of bisphenol AF, 20 parts reacted graphite. The compound was pressed into 0.2 cm thick slabs and cured at 177° C. for 60 min followed by a heat treatment for two days under nitrogen. The compounded elastomer was tested as in Example I, and the tensile and tear test results for this compound and for a control containing 20 phr unreacted graphite powder are given in Table II.

TABLE II

High temperature Tensile and Tear Tests of Fluoroelastomers Containing Reacted Graphite powder vs. Graphite Powder Control

|  |  | Control Graphite | Example II |
|---|---|---|---|
| 100° C. | phr | 20 | 20 |
|  | $T_B$ (MPa) | 5.1 | 6.8 |
|  | $E_B$ (%) | 55 | 80 |
|  | Tear (KN/M) | 1.4 | 1.8 |
| 177° C. | $T_B$ | 2.8 | 3.5 |
|  | $E_B$ (%) | 30 | 50 |
|  | Tear (kN/m) | 0.5 | 0.9 |

The addition of reacted graphite powder to a typical perfluoroelastomer formulation significantly increases tensile strength at elevated temperatures. The use of reacted graphite leads to higher values for tensile strength than the unreacted graphite control.

EXAMPLES III AND IV

A 20 gm sample of SAF black and a 20 gm sample of 5 um graphite powder were reacted with sodium metal and with pentafluorobenzyl halide as in Example I above except that pentafluorobenzyl bromide was used instead of the iodo-compound. The reacted carbon particles were mill mixed into a formulation of perfluoroelastomer as used in Example I as follows: 100 parts perfluoroelastomer, 4 parts PbO, 4 parts DCH-13 Crown 6, 3 dipotassium salt of bisphenol AF, 20 parts reacted carbon prepared above. The compounds were pressed into 0.2 cm thick slabs and were cured at 177° C. for 60 minutes followed by a heat treatment for two days under nitrogen. Tensile and tear tests results for these compounds are given in Table III.

TABLE III

High Temperature Tensile and Tear Tests of Fluoroelastomers Containing Reacted SAF Black and Graphite Powder

| | | Example III Reacted SAF | Example IV Reacted Graphite |
|---|---|---|---|
| 100° C. | phr | 20 | 20 |
| | $T_B$ (MPa) | 5.8 | 7.0 |
| | $E_B$ (%) | 90 | 60 |
| | Tear (kN/m) | 0.9 | 1.1 |
| 177° C. | $T_B$ (MPa) | 3.7 | 3.3 |
| | $E_B$ (%) | 50 | 40 |
| | Tear (kN/m) | 0.3 | 0.3 |

Reaction of the carbon particles with sodium metal followed by pentafluorobenzyl bromide leads to significant increases in tensile strength at high temperatures.

COMPARATIVE EXAMPLES A-C

In Comparative Examples A-C, untreated graphite and two reactive graphites as prepared in Examples I and III were blended with curable, hydrogen containing, fluoroelastomer prepared from vinylidene fluoride and hexafluoropropene as described in Apotheker et al., U.S. Pat. No. 4,214,060. The reactive graphites were prepared using pentafluorobenzyl bromide. The graphites were mill mixed into the fluoroelastomer formulation as follows: 100 fluoroelastomer, 3 parts Magnesium oxide, 6 parts CaOH, 30 parts graphite. The compounds were pressed into 0.2 cm thick slabs and cured for 30 minutes at 177° C. followed by heat treatment for 24 hours at 232° C. Tensile and tear test results for these compounds are given in Table IV.

TABLE IV

TENSILE AND TEAR TESTS OF VITON FLUOROELASTOMER COMPOUNDS CONTAINING REACTED GRAPHITE VS GRAPHITE POWDER CONTROL

| | Comparative Example | A | B | C |
|---|---|---|---|---|
| 25° C. | phr filler | 30 | 30 | 30 |
| | $T_B$ | 15 | 15 | 17 |
| | $E_B$ | 170 | 175 | 155 |
| | Tear (kN/m) | 5 | 5 | 4 |
| 177° C. | $T_B$ (Mpa) | 6 | 5 | 5 |
| | $E_B$ | 70 | 50 | 60 |
| | Tear (kN/m) | 0.5 | 0.5 | 0.5 |

The data indicate that the present reacted graphites do not improve the tensile properties of curable vinylidene fluoride/hexafluoropropene copolymers beyond untreated graphite.

COMPARATIVE EXAMPLES D TO G

In Comparative Examples D to G, untreated carbon blacks and carbon blacks with reactive sites were compounded with a curable, hydrogen containing, copolymer of vinylidene fluoride, and hexafluoro-propene fluoroelastomer. In Comparative Examples D and E, a black was used having a particle diameter of 0.1 millimicron and a surface area of 33 square meters per gram. In Comparative Examples F and G, the carbon black used had a particle diameter of 0.5 millimicron and a surface area of 9 square meters per gram. In Comparative Examples F and G, the carbon blacks were cleansed at 1000° C., reacted with sodium metal and then reacted with pentafluorobenzyl bromide as in Example I above. The carbon blacks were blended with a curable, hydrogen containing, fluoroelastomer available from E. I. du Pont de Nemours and Company as Viton E-430. This elastomer is not a perfluoroelastomer as used in the present invention. The blacks were mill mixed into a Viton E-430 formulation as follows: 100 parts Viton E-430 fluoroelastomer, 3 parts Magnesium oxide, 6 parts CaOH, 30 parts carbon black. The compounds were pressed into slabs, cured and post cured as in Comparative Example A above. Tensile and tear test results for these compounds are given in Table V.

TABLE V

TENSILE AND TEAR TESTS OF VITON FLUOROELASTOMER COMPOUNDS CONTAINING REACTED VS UNREACTED CARBON BLACK CONTROLS

| | Comparative Example | D | E | F | G |
|---|---|---|---|---|---|
| 25° C. | phr | 30 | 30 | 30 | 30 |
| | $T_B$ (MPa) | 17 | 17 | 13 | 13 |
| | $E_B$ (%) | 210 | 170 | 280 | 240 |
| | Tear (kn/m) | 4 | 4 | 5 | 3 |
| 177° C. | $T_B$ (MPa) | 6 | 6 | 4 | 4 |
| | $E_B$ (%) | 105 | 80 | 105 | 70 |
| | Tear (kN/m) | 1.0 | 0.7 | 0.5 | 0.4 |

The data indicate that the reacted carbon blacks do not improve the tensile or tear strength of Viton E-430 fluoroelastomer over the unreacted carbon blacks.

I claim:

1. A solid, particulate filler selected from the group consisting of carbon black and graphite having chemically bonded thereto reactive sites of the general formula

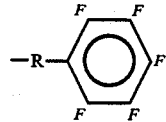

wherein R is selected from the group consisting of a divalent bond, —CH$_2$— and —CH$_2$CH$_2$—.

2. A filler of claim 1 wherein the carbonaceous material to which the reactive sites are bonded is carbon black.

3. A filler of claim 1 wherein the carbonaceous material to which the reactive sites are bonded is graphite.

4. An elastomeric composition comprising complementally,
    (a) 95-50 weight percent of at least one perfluoronated elastomer prepared from tetrafluoroethylene, perfluoromethylvinylether and a monomer of the general formula

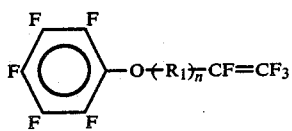
wherein $R_1$ is selected from
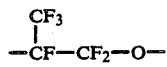
and —$CH_2CH_2CH_2$—O— and wherein n is 0, 1 or 2 and
(b) 5–50 weight percent a solid particulate filler selected from the group consisting of carbon black and graphite having chemically bonded thereto reactive sites of the general formula
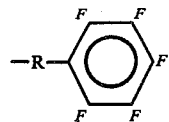
wherein R is selected from the group consisting of a divalent bond, —$CH_2$— and —$CH_2CH$—.
* * * * *